Oct. 5, 1943.  D. W. BORST  2,331,103
ELECTRIC CONTROL SYSTEM
Filed Sept. 1, 1942
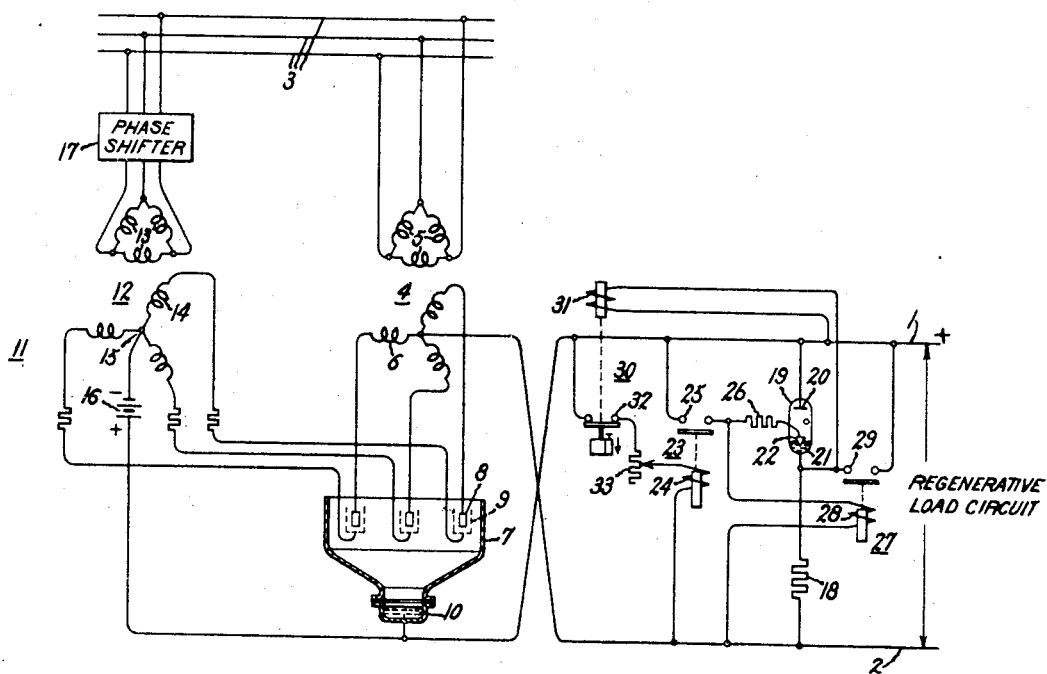
Inventor:
David W. Borst,
by Harry E. Dunham
His Attorney.

Patented Oct. 5, 1943

2,331,103

UNITED STATES PATENT OFFICE 2,331,103

ELECTRIC CONTROL SYSTEM

David W. Borst, Schenectady, N. Y., assignor to General Electric Company, a corporation of New York Application September 1, 1942, Serial No. 456,905

11 Claims. (Cl. 171—97)

My invention relates to electric control systems and more particularly to electric valve protective systems for application to regenerative load circuits.

In some systems where a load circuit is capable of regeneration, it is desirable to connect across the load circuit means for absorbing the energy incident to the regenerative operation, thereby protecting the equipment connected to the load circuit. In accordance with the teaching of my invention, I provide new and improved electric protective apparatus for regenerative load circuits which responds very rapidly to the regenerative load condition and which reduces the load imposed on the associated control equipment.

It is an object of my invention to provide a new and improved electric control system.

It is another object of my invention to provide a new and improved electric valve protective system for regenerative load circuits.

It is a further object of my invention to provide a new and improved electric valve protective system for electric rectifiers.

It is a still further object of my invention to provide a new and improved protective system for a regenerative load circuit which intermittently effects connection of a load device to absorb the energy incident to the regenerative condition so long as the condition exists.

Briefly stated, in the illustrated embodiment of my invention I provide an electric valve protective system for a regenerative load circuit which is energized from an electric valve rectifier. A loading resistance is connected to the load circuit through an electric valve means which is normally nonconducting and is rendered conducting upon the occurrence of the voltage incident to regeneration by voltage responsive means connected to the load circuit. The voltage responsive means is energized by time delay means for a predetermined interval of time, and the desired period of energization of the voltage responsive means is obtained by the time delay means which is controlled in response to an electrical condition of the electric valve means, or in response to the operation of a relay means controlled by the voltage responsive means. The last mentioned relay means may also be employed to connect the loading resistance to the regenerative load circuit independently of the anode-cathode circuit of the electric valve means, and may be arranged to be controlled by the voltage responsive means. When the electric valve means is of the type employing an ionizable medium, the relay means also serves to render the electric valve means non-conducting by having contacts connected across the anode and cathode of the electric valve means.

For a better understanding of my invention, reference may be had to the following description taken in connection with the accompanying drawing, and its scope will be pointed out in the appended claims. The single figure of the drawing represents an embodiment of my invention as applied to a polyphase rectifier for energizing a direct current regenerative load circuit.

Referring now to the single figure of the drawing, I have there illustrated my invention as applied to a protective system for an electric translating system wherein unidirectional current is transmitted to a regenerative load circuit including a positive conductor 1 and a negative conductor 2 from a polyphase alternating current supply circuit 3. The translating apparatus may include a transformer 4 having primary windings 5 and secondary windings 6 which are connected to an electric valve means or rectifier 7 comprising a plurality of anodes 8, associated control members or grids 9 and a cathode 10. Suitable starting means (not shown) may be employed to initiate an arc discharge within the electric valve means.

The magnitude of the voltage supplied to the load circuit may be controlled by means of a circuit 11 which impresses on the grids 9 voltages of predetermined phase displacement relative to the voltages of the associated anodes. The circuit 11 may comprise a transformer 12 having primary windings 13 and secondary windings 14 provided with a neutral connection 15. If desired, a suitable source of negative unidirectional biasing potential, such as a battery 16, may be connected between the cathode 10 and the neutral connection 15. The phase relationship between the anode voltages and the grid voltages may be controlled or adjusted by means of a phase shifter 17 connected between primary winding 13 of transformer 12 and supply circuit 3.

In order to protect the system under regenerative load conditions, that is when the load circuit regenerates, I provide load device or means, such as a loading resistance 18, for absorbing the energy incident to the regeneration operation. As will be explained hereinafter more particularly, I provide means for intermittently connecting the loading resistance 18 to the load circuit so long as the regenerative operation exists, thereby not only providing protection for the equipment so long as the regeneration exists but also assuring that the protective apparatus is not connected to the load circuit for periods longer than required or desired.

I connect an electric valve means 19 in series relation with the loading resistance 18 across the load circuit. The electric valve means is preferably of the type employing an ionizable medium, such as a gas or a vapor, capable of supporting an arc discharge and comprises an anode 20, a cathode 21 and a control member 22 which may be of the immersion-ignitor type constructed of a material, such as boron-carbide or silicon-carbide, having an electrical resistivity large compared with that of the mercury of the associated pool cathode. An arc discharge is established between the anode and the cathode upon transmitting to the control member 22 a current equal to or greater than the minimum current required to initiate a cathode spot.

The electric valve means 19 may be of the type in which the cathode 21 is not insulated from the enclosing receptacle or metallic portion which constitutes the enclosing chamber and which houses the electrode structure.

I provide means responsive to the regenerative load condition, such as a voltage responsive means 23 which may be a high speed electromagnetic relay 23 having an actuating coil 24 and contacts 25 for initiating an operation to effect connection of the loading resistance 18 to the load circuit. The relay 23 may be arranged to connect the immersion-ignitor control member 22 to the anode 20 of the electric valve means 19 through a current limiting resistance 26 so that the control member 22 is energized when the voltage of the load circuit rises under regenerative conditions.

I provide recycling means, that is means for effecting connection of the loading resistance 18 intermittently to the load circuit for predetermined intervals of time in response to the operation of the voltage responsive relay 23. The recycling means may comprise a single element or a plurality of elements such as an electromagnetic contactor or relay 27 having an actuating coil 28 and contacts 29. Actuating coil 28 may be connected to be controlled by contacts 25 of the voltage responsive relay 23. Relay 27 also performs an additional function of independently connecting the loading resistance 18 to the load circuit independently of the electric valve means 20. It will be noted that its contacts 29 are connected between the cathode 21 and the positive conductor 1 of the load circuit. Contactor or relay 27 also serves as a means for rendering the electric valve means 19 nonconducting by providing a shunt path around the anode 20 and the cathode 21.

In order to effect connection of the loading resistance 18 to the load circuit for a predetermined interval of time in response to the operation of the voltage responsive relay 23 and relay 27, I provide a timing means, such as a time delay relay 30, having an actuating coil 31 and contacts 32 which are connected in series relation with the actuating coil 24 of relay 23. A current adjusting resistance 33 may be connected in series relation with coil 24 if desired. Time delay relay 30 is designed to open its contacts 32 a predetermined interval of time after the closure of contacts 29 of relay 27, or a predetermined interval of time after the occurrence of an electrical condition such as the drop of anode-cathode voltage of the electric valve means 19 occasioned by the initiation of current conduction.

The operation of the embodiment of my invention shown in the single figure of the drawing will be explained by first considering the system when it is operating in the normal or desired manner, that is when rectifier 7 and associated equipment are transmitting unidirectional current to the load circuit. So long as the load circuit does not regenerate, the voltage thereof will not rise excessively and the loading resistance 18 will not be connected to the load circuit, inasmuch as the voltage responsive relay 23 is designed to close its contacts 25 only upon the occurrence of the excessive voltage condition incident to regeneration. Consequently, the electric valve means 19 will be maintained nonconducting and relay 27 will not be energized.

If the load circuit regenerates, due to the fact that the rectifier 7 by virtue of its unidirectional conducting characteristic cannot conduct current in the reverse direction, the voltage between conductors 1 and 2 of the load circuit begins to rise to a value and attains a value greater than the setting of the voltage responsive relay 23. Since actuating coil 31 of relay 30 is connected across the anode and cathode of the electric valve means 19 which is nonconducting, and across the contacts 29 of relay 27 which are open, the energization of coil 31 is sufficient to maintain the relay energized and the contacts 32 closed. As soon as the excessive voltage incident to regeneration occurs, relay 23 closes its contacts 25 substantially instantaneously, thereby connecting the control member 22 to conductor 1 and effecting the transmission of energizing current to the control member. As a result thereof, electric valve means 19 will be rendered conducting, thereby connecting the loading resistance 18 across the load circuit so that it can absorb all or a large percentage of the energy incident to the regenerative operation.

Upon closure of contacts 25 of relay 23, actuating coil 28 of relay 27 is energized, thereby effecting closure of its contacts 29 to connect the loading resistance 18 directly across the load circuit and independently of the electric valve means 19. This operation may occur coincidentally with or subsequent to the initiation of current conduction by electric valve means 19. The presence of electric valve means 19 assures a substantially instantaneous connection of loading resistance 18 to the load circuit, and as soon as relay 27 closes its contacts 29 the electric valve means 19 becomes nonconducting because contacts 29 shunt the anode and cathode. In this manner, the duty imposed on the electric valve means 19 is reduced. Furthermore, the contactor or relay 27 enables an electric valve means not provided with insulation between the cathode and the enclosing structure to be used in a control system of this nature.

The time delay relay 30, which may be initiated in its operation either in response to the reduction in the anode-cathode voltage of electric valve means 19 or the closure of contacts 29 which shunts the actuating coil 31, initiates a time delay operation, that is opens its contacts 32 a predetermined interval of time after the closure of contacts 29. Upon the expiration of the predetermined interval of time established by setting of relay 30, actuating coil 24 of the voltage responsive relay 23 is deenergized. Opening of its contacts 25 terminates the period of energization of actuating coil 28 of relay 27, thereby disconnecting the loading resistance 18 from the load circuit.

If the regenerative load condition has disappeared, no further operation takes place. However, if the regenerative load condition has continued to exist a regenerating operation takes place because as soon as contacts 29 of relay 27 are opened, actuating coil 31 of time delay relay 30 is again energized effecting rapid closure of contacts 32. In this manner, the voltage responsive relay 23 is effectively connected to retest the load voltage conditions, and if the voltage is sufficiently great, indicating regeneration, the above described sequence of operation is repeated to connect the loading resistance 18 to the load circuit for a second predetermined interval of time. This intermittent or recycling operation, wherein the loading resistance 18 is connected to the load circuit, continues until the regenerative load condition disappears.

It will be noted that the time delay relay 30 is designed to open its contacts with a predetermined time delay, but is arranged to close its contacts almost instantaneously upon the opening of contacts 29 of relay 27, thereby effecting the testing or rechecking of the regenerative load condition within a very short interval of time so that the associated translating apparatus is not subjected to the over-voltage condition for an appreciable length of time.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a direct current circuit, a regenerative load circuit, a load device, electric valve means for effecting connection of said load device to said load circuit, voltage responsive means connected to said load circuit for controlling said electric valve means, and recycling means responsive to a regenerative condition of said load circuit for effecting intermittent operation of said voltage responsive means.

2. In combination, a direct current circuit, a regenerative load circuit, a load device, electric valve means having a control member for effecting connection of said load device to said load circuit, voltage responsive means for controlling said electric valve means and for controlling the energization of said control member, and recycling means responsive to said voltage responsive means for effecting intermittent operation of said electric valve means.

3. In combination, a direct current circuit, a regenerative load circuit, a load device, electric valve means having a control member for effecting connection of said load device to said load circuit, excitation means for energizing said control member and for initiating conduction by said electric valve means, voltage responsive means connected to said load circuit for controlling said excitation means, and recycling means responsive to said voltage responsive means for effecting intermittent operation of said excitation means.

4. In combination, a direct current circuit, a regenerative load circuit, a load device, electric valve means having a control member and being connected in series relation with said load device across said load circuit, excitation means for energizing said control member and for initiating conduction by said electric valve means, voltage responsive means connected to said load circuit for controlling said excitation means, and recycling means connected to the voltage responsive means for intermittently effecting operation of said excitation means so long as a regenerative condition of said load circuit exists.

5. In combination, a direct current circuit, a regenerative load circuit connected to said direct current circuit, a loading resistance, a normally nonconducting electric valve means connected across said load circuit in series relation with said loading resistance, said electric valve means having a control member, an excitation circuit for rendering said electric valve means conducting and connected to said control member and comprising a relay having an actuating coil responsive to the voltage of said load circuit, time delay means connected in series relation with said actuating coil, and means responsive to the voltage responsive relay and connected in series relation with said loading resistance for connecting said loading resistance to said load circuit independently of said electric valve means.

6. In combination, a direct current circuit, a regenerative load circuit connected to said direct current circuit, a loading resistance, electric valve means having an anode, a cathode and a control member, the anode-cathode circuit being connected in series relation with said resistance across said load circuit, means connected to said control member for rendering said electric valve means conducting when the voltage of said load circuit tends to exceed a predetermined value, time delay means for rendering the last mentioned means ineffective a predetermined interval of time after a discharge is initiated between said anode and said cathode, and means responsive to the voltage responsive means for connecting said loading resistance to said load circuit independently of and subsequent to the initiation of conduction by said electric valve means.

7. In combination, a direct current circuit, a regenerative load circuit, a loading resistance, electric valve means including an anode, a cathode and a control member connected in series relation with said loading resistance across said load circuit, a voltage responsive relay for effecting energization of said control member, time delay means responsive to the voltage across said anode and said cathode for controlling the period of operation of said voltage responsive means, and means for connecting said loading resistance to said load circuit independently of the anode-cathode circuit of said electric valve means.

8. In combination, a direct current circuit, a regenerative load circuit, a loading resistance, electric valve means having an anode, a cathode and a control member and connected in series relation with said loading resistance across said load circuit, means for effecting energization of said control member and for rendering said electric valve means conducting in response to the voltage of said load circuit and comprising a voltage responsive relay having an actuating coil and contacts in series relation between one terminal of said load circuit and said control member, a time delay electromagnetic relay having an actuating coil and normally closed contacts, the time delay relay being energized in response to the voltage appearing between said anode and said cathode, and relay means having contacts connected in series relation with said resistance for connecting said resistance to said load circuit independently of the electric valve means and having an actuating coil controlled by contacts of the voltage responsive relay.

9. In combination, a direct current circuit, a regenerative load circuit connected to said direct current circuit, a loading resistance, electric valve means connected across said load circuit in series relation with said loading resistance, said electric valve means having a control member, an excitation circuit for rendering said electric valve means conducting and connected to said control member and comprising voltage responsive means for effecting energization of said control member when the voltage of said load circuit under regenerative conditions attains a predetermined value, time delay means for controlling the period during which said voltage responsive means is connected to said load circuit, and means responsive to the voltage responsive means and connected in series relation with said loading resistance for connecting said loading resistance to said load circuit.

10. In combination, a direct current circuit, a regenerative load circuit connected to said direct current circuit, a loading resistance, electric valve means having a control member and connected in series relation with said loading resistance across said load circuit, excitation means connected to said control member for initiating current conduction by said electric valve means, means independent of said electric valve means for connecting said loading resistance to said load circuit, voltage responsive means connected to said load circuit for controlling said excitation means in response to the voltage of said load circuit under regenerative conditions, and recycling means for effecting intermittent control of the voltage responsive means and the means independent of said electric valve means so long as the regenerative condition of said load circuit exists.

11. In combination, a direct current circuit, a regenerative load circuit connected to said direct current circuit, a loading resistance, an electric valve means having a control member and being connected in series relation with said loading resistance, excitation means connected to said control member for rendering said electric valve means conducting, relay means for connecting said loading resistance to said direct current circuit independently of said electric valve means, voltage responsive means connected to said load circuit for controlling said excitation means, and time delay means responsive to an electrical condition of said electric valve means for initiating a timing operation to control the operative period of the voltage responsive means thereby effecting intermittent connection of said loading resistance to said load circuit so long as the regenerative condition exists.

DAVID W. BORST.